(12) United States Patent
Kessler et al.

(10) Patent No.: US 6,252,621 B1
(45) Date of Patent: Jun. 26, 2001

(54) PRINTING LENTICULAR IMAGES

(75) Inventors: David Kessler, Rochester; Lee W. Tutt, Webster, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/128,077

(22) Filed: Aug. 3, 1998

(51) Int. Cl.[7] ........................................... B41J 2/455
(52) U.S. Cl. ................................. 347/233; 347/238
(58) Field of Search ................................. 347/157, 225, 347/233, 236, 238, 240, 259, 241, 243

(56) References Cited

U.S. PATENT DOCUMENTS

| | | | |
|---|---|---|---|
| 5,216,478 | * 6/1993 | Kadowaki et al. | 356/356 |
| 5,241,329 | * 8/1993 | Guerin | 347/233 |
| 5,349,419 | 9/1994 | Taguchi et al. | 355/22 |
| 5,436,027 | * 7/1995 | Offer | 427/10 |
| 5,533,152 | * 7/1996 | Kessler | 385/11 |
| 5,589,870 | * 12/1996 | Curry et al. | 347/233 |
| 5,671,077 | * 9/1997 | Imakawa et al. | 347/236 |
| 5,844,707 | * 12/1998 | Minakuchi et al. | 347/238 |
| 5,848,083 | * 12/1998 | Haden et al. | 347/17 |
| 6,084,626 | * 7/2000 | Ramanujan et al. | 347/239 |

FOREIGN PATENT DOCUMENTS

| | | |
|---|---|---|
| 0 596 629 | 5/1994 | (EP) . |
| 0 659 026 | 6/1995 | (EP) . |
| 42-5473 | 3/1967 | (JP) . |
| 48-6488 | 2/1973 | (JP) . |
| 49-607 | 1/1974 | (JP) . |
| 53-33847 | 9/1978 | (JP) . |
| 59-3781 | 1/1984 | (JP) . |

* cited by examiner

*Primary Examiner*—N. Le
*Assistant Examiner*—Lamson D. Nguyen
(74) *Attorney, Agent, or Firm*—Svetlana Z. Short

(57) ABSTRACT

A method for printing images on a recording material by way of at least two multimode laser beams created by emitting apertures of at least two multimode lasers includes the steps of: forming with each of said multimode lasers a spot having a long dimension and a short dimension with each of the multimode laser beams such that the long dimension of each of the spots corresponds to a long dimension of a respective emitting aperture of each of the multimode lasers; and scanning the spots created by the multimode laser beams across the recording material such that (i) the long dimension of each of the spots is parallel to scan direction, and (ii) so as to create a series of spaced apart swaths, each of which has a plurality of image lines, the spacings between the image lines of a swath being different from spacing between two adjacent swaths.

24 Claims, 7 Drawing Sheets

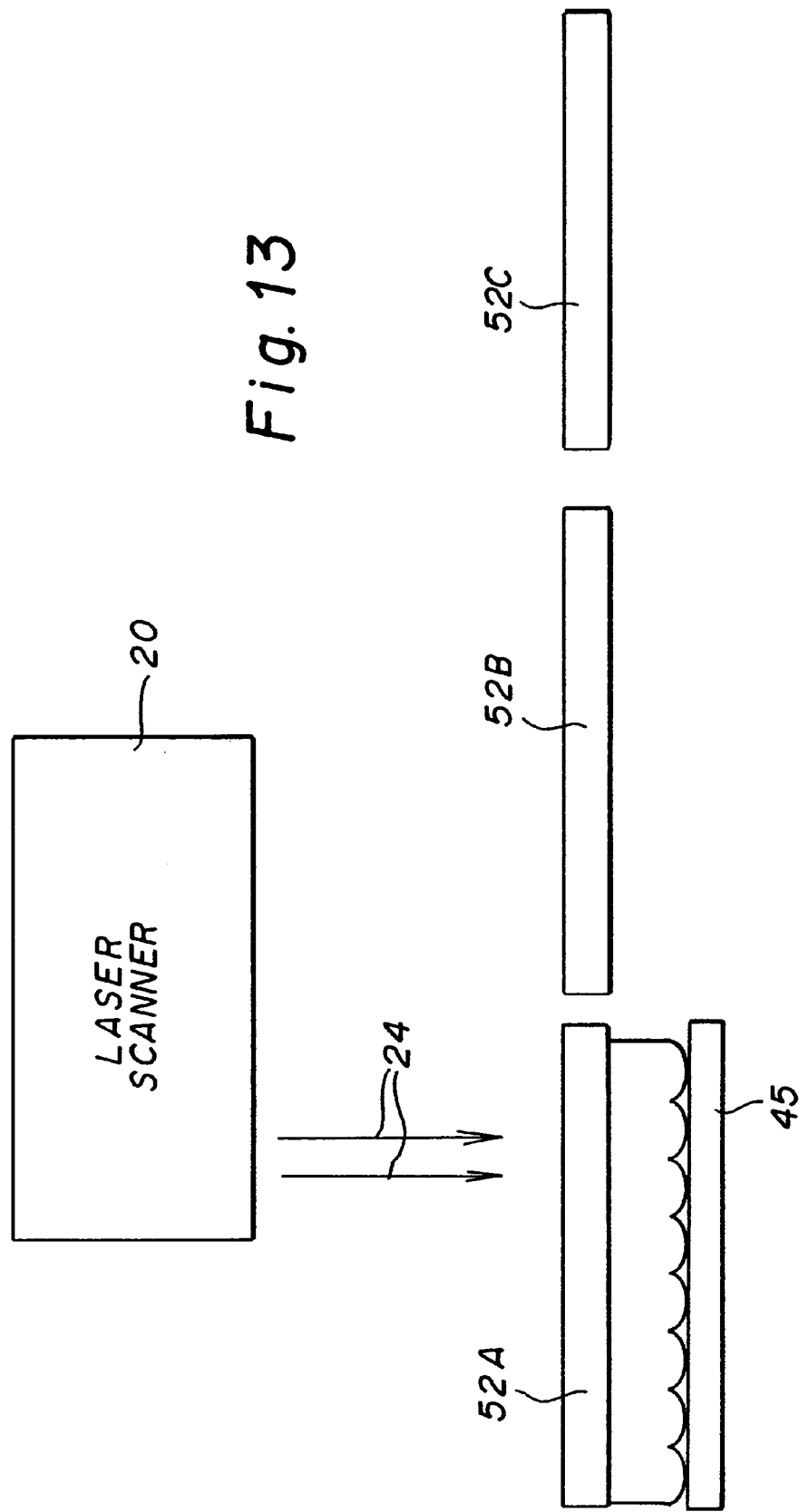

PRINTING LENTICULAR IMAGES

CROSS-REFERENCE TO RELATED APPLICATIONS

Cross-reference is made to commonly assigned copending U.S. Application Ser. No. 09/128521, filed concurrently herewith and entitled "FLYING SPOT LASER PRINTER APPARATUS AND A METHOD OF PRINTING SUITABLE FOR PRINTING LENTICULAR IMAGES", by David Kessler et al.

U.S. Ser. No. 08/961,057, filed Oct. 30, 1997, entitled "A Method for Printing Interdigitated Images," by Lee W. Tutt and U.S. Ser. No. 08/828,637, filed Mar. 31, 1997, entitled "Apparatus and Method for Aligning and Printing Multiple Images," by Roger R. A. Morton are incorporated herein by reference.

FIELD OF THE INVENTION

The present invention relates in general to printing lenticular images with a flying spot scanner and a plurality of lasers, and is especially suitable for printing lenticular images using a galvo-mirror scanner and a plurality of multimode lasers.

BACKGROUND OF THE INVENTION

Lenticular sheets are used to give images an appearance of depth. More specifically, a lenticular sheet comprises a transparent upper layer A having narrow, parallel lenticulas (semi-cylindrical lenses) B on an outer surface, and an image-containing substrate layer C which projects images through the lenticulas. (See FIG. 1A). The two layers of a lenticular sheet provide an image such that different portions of the image are selectively visible as a function of the angle from which the lenticular sheet is viewed. If the image is a composite picture made by bringing together into a single composition a number of different parts of a scene photographed from different angles, and the lenticulas are vertically oriented, each eye of a viewer will see different elements and the viewer will interpret the net result as a three dimensional (3-D) image. The viewer may also move his head with respect to the lenticular sheet thereby observing other views with each eye and enhancing the sense of depth.

Another method for showing 3-D images is the use of a blocking line screen positioned at a specific distance from the composite picture. This process, known as a parallax process, causes blocking of all images except one specific image. This allows the eyes to view different images as three-dimensional (3-D) images, when the blocking line screen is oriented vertically.

When the lenticulas or the blocking line screen is oriented horizontally, each eye receives the same image. In this case, the multiple images give illusion of motion when the composite image is rotated about a line parallel to the viewer's eyes. Thus, a simulation of motion is achieved by the process of tipping the lenticular sheet or the blocking line screen, or by movement of the viewer's head to a different angle with respect to the lenticular sheet.

Whether the lenticulas or the blocking line screen is oriented vertically or horizontally, each of the viewed images is generated by lines of images (also referred to as image lines) which have been interlaced at the spatial frequency of the lenticulas or the blocking line screen. Interlacing lines of each image with other images is referred to as interdigitation. A full set of such interdigitated image lines forms a lenticular image. Interdigitation can be better understood by using an example of four images used to form a composite image with a material having three lenticulas. In this example, line 1 from each of the four images is in registration with the first lenticule; line 2 from each of the four images is in registration with the second lenticule; etc. Each lenticule is associated with a plurality of image lines D or an image line set (See FIG. 1), and the viewer sees only one image line of each set with each eye for each lenticule. It is imperative that the image line sets be registered accurately with respect to the lenticulas, so that the proper picture is formed when the assembly is viewed. One method of conventional recording of the interdigitated image lines requires recording of the interdigitated image lines on a recording material contained on the substrate layer C and then attaching the substrate layer C to the upper layer A, with the recorded image lines D in precise alignment to the lenticulas B to yield the desired image structure. The precise alignment of the specific lenticulas with the desired image line set during the attachment of the recording material to the lenticular overlay is difficult to achieve. This results in a degraded image quality.

Conventional recording of lenticular images has been accomplished with a stereoscopic image recording apparatus that uses optical exposure. A light source, such as a halogen lamp, is projected through an original image, via a projection lens, and focused on the substrate layer of the lenticular sheet. The lenticular images are exposed on a recording material as interdigitated image lines. Japanese (Kokoku) Patent Applications Nos. 5473/1967, 6488/1973, 607/1974, and 33847/1978 disclose recording apparatus in which two original images are projected for printing on a lenticular recording material. Recording lenticular images in this fashion (i) requires complex projection lens systems, which are expensive, and (ii) does not work well with thermal dye transfer approaches because it requires more power than what is produced by a halogen lamp or a similar light source.

In contrast, image recording by scanning (linear) exposure requires comparatively simple optics, yet has great flexibility in adapting to various image processing operations, and to alterations in the dimension of the lenticulas. To take advantage of these features, various apparatus and methods have been proposed for recording an image by scanning exposure. For example, Japanese (Kokoku) Patent Application No. 3781/1984 teaches a stereoscopic image recording system in which a plurality of original images is taken with a TV camera, processed and stored in frame memories from which the stored image signals are retrieved sequentially as image lines in accordance with the pitch of lenticulas used. After the image lines are recorded on a substrate layer by scanning exposure, the upper layer of the lenticular sheet is bonded to the substrate layer containing the image lines. Another image recording system uses polygon scanners, described in U.S. Pat. No. 5,349,419, for exposure of stereoscopic images directly on photosensitive back surface of a lenticular sheet.

It is desirable to write interdigitated images directly on a back surface of lenticular sheet using thermal dye transfer. This would eliminate the need for careful alignment of specific pre-printed image lines of the substrate layer with the specific lenticulas of the upper layer of the lenticular sheet. The use of thermal dye transfer to write such interdigitated images requires, however, large amounts of energy. Such energy can be provided by high power lasers.

Furthermore, high quality lenticular images require that a large number of images be placed behind a fine pitched lenticular sheet. For example, in order to produce 25 images with a lenticular sheet of 100 lenticulas per inch, one needs to produce 2500 lines per inch of continuous tone spots. This requires a pixel size of approximately 10 microns or less. To expose such a small pixel, the beam size has to be of approximately the same size as the pixel size. A single mode laser can easily provide such a small beam size. Therefore, a single mode laser may be used to write interdigitated images. Unfortunately, high power, inexpensive single mode diode lasers are not available.

The cross-referenced patent application entitled FLYING SPOT LASER PRINTER APPARATUS AND A METHOD OF PRINTING SUITABLE FOR PRINTING LENTICULAR IMAGES, by David Kessler et al, filed concurrently herewith discloses that this problem can be solved by utilizing a multimode laser to write interdigitated images. Such lasers provide the necessary high power and are relatively inexpensive. Unfortunately, a multimode laser beam provided by such a laser has a large cross section at a scanning mirror in order to provide the required small spot at the recording material. Therefore, the scanning mirror requires a very large mirror aperture. Hologon and polygon scanners are frequently used in flying spot printers. If such large mirror apertures can be avoided, hologon and polygon scanners could be made less expensive and bulky, and could be more easily maintained in a vibration free environment.

Galvanometer mirrors (galvo-mirrors) can provide a large mirror aperture and still be physically light and inexpensive. Resonant galvo-mirrors can provide speed and aperture but have a sinusoidal variation in writing pixel time creating very complex signal timing and dwell time problems. Non-resonant galvo-mirrors do not have this problem. However, non-resonant galvo-mirrors are relatively slow. Compensation for the slow speed of the non-resonant galvo-mirrors by printing with multiple laser beams provided by multiple lasers is also difficult, for the reasons described below.

Unfortunately, humidity and temperature variations cause the spacing between the lenticulas to change slightly, changing the pitch of the lenticular sheet. When this happens, the pitch of image lines needs to be adjusted so that correct image line sets correspond to the proper lenticulas. When one writes with a single multimode laser, one can easily change the spacings between each of the image lines by changing the translation speed (in a cross-scan direction) of the recording material. However, with the use of a galvo-mirror the printing speed becomes an issue. Galvo-mirrors are limited to about 200 Hz scanning frequency and thus become the limiting factor for printing speed.

To increase the printing speed in a system using a (non-resonant) galvo-mirror, it would be advantageous to simultaneously use more than one multimode laser. However, changing the spacing between the lasers so as to compensate for humidity and temperature variations is difficult and expensive. When the spacing of the image lines is maintained constant, and the width of the lenticulas changes, the registration of image lines and the lenticule is no longer correct (see FIG. 1B). This results in either the wrong viewing distance, or in scrambled images (i.e., a viewer will simultaneously see different portions of different images).

SUMMARY OF THE INVENTION

It is an object of the present invention to provide a method of printing lenticular images that compensates for changes in the pitch of the lenticular sheets while providing a fast printing speed.

The present invention is directed to overcoming one or more of the problems set forth above. Briefly summarized, a method for printing images on a recording material by way of at least two multimode laser beams created by emitting apertures of at least two multimode lasers includes the steps of: forming a spot having a long dimension and a short dimension with each of the multimode laser beams, such that the long dimension of each of the scanning spots corresponds to a long dimension of the respective emitting aperture of one of the multimode lasers; and scanning the multimode laser beams across a recording material such that (i) the long dimension of each of the scanning spots is parallel to scan direction, and (ii) creating a series of spaced apart swaths, each of which has a plurality of image lines, the spacing between the image lines of a swath being different from spacing between two adjacent swaths.

According to one embodiment of the present invention an apparatus for generating lenticular images on a lenticular sheet having a plurality of lenticulas includes: a plurality of lasers, each having an emitting aperture, wherein the lasers are multimode in a first direction and single mode in a second direction perpendicular to the first direction; a galvo-mirror scanner oriented to scan the laser beams from the lasers along scan lines such that a long dimension of the emitting apertures corresponds a fast scanning direction of the scanner; and a driver for moving the lenticular sheet relative to the scan lines. The driver is capable of moving the lenticular sheet such that the spacing between the image lines produced in one scan is different from spacing between the image lines produced by two adjacent scans.

The above, and other objects, advantages and novel features of the present invention will become more apparent from the accompanying detailed description thereof when considered in conjunction with the following drawings.

BRIEF DESCRIPTION OF THE DRAWINGS

FIG. 3A corresponds to a short dimension of the emitting aperture. FIG. 3B corresponds to a long dimension of the emitting aperture.

FIG. 13 is a schematic view of an embodiment that utilizes a multimode diode lasers to consequently expose three thermal donors in order to write image lines on the lenticular sheet.

DETAILED DESCRIPTION OF THE INVENTION

The present description will be directed in particular to elements forming part of, or in cooperation more directly with, the apparatus in accordance with the present invention. It is understood that elements not specifically shown or described may take various forms well known to those skilled in the art.

Figure 1A:
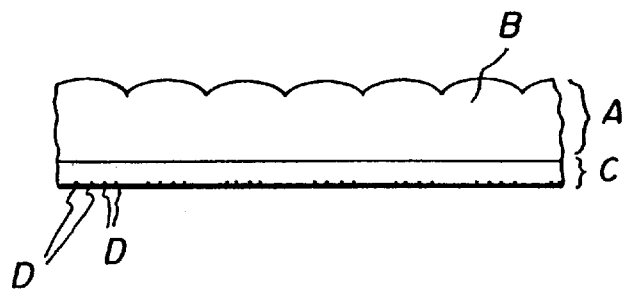
FIG. 1A illustrates a prior art lenticular sheet.
Figure 1B:
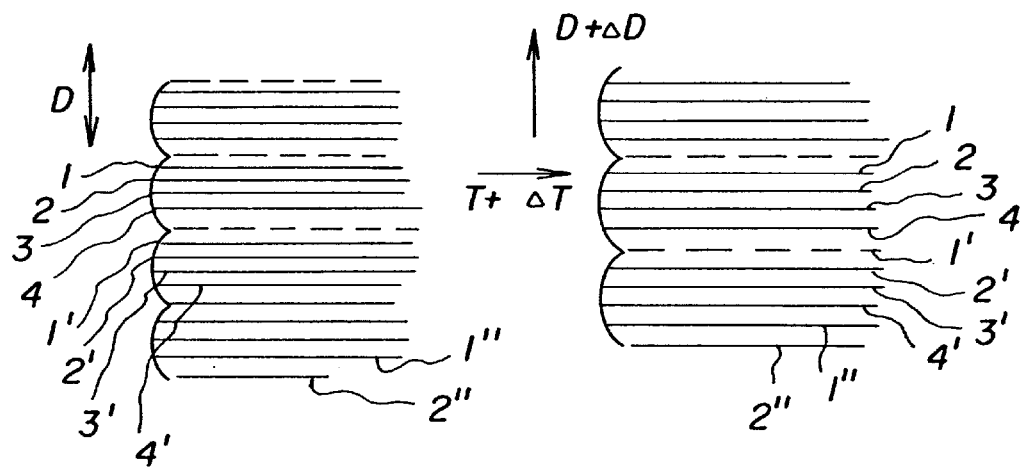
FIG. 1B illustrates how a temperature change results in incorrect registrations between image lines and lenticulas.
Figure 2:
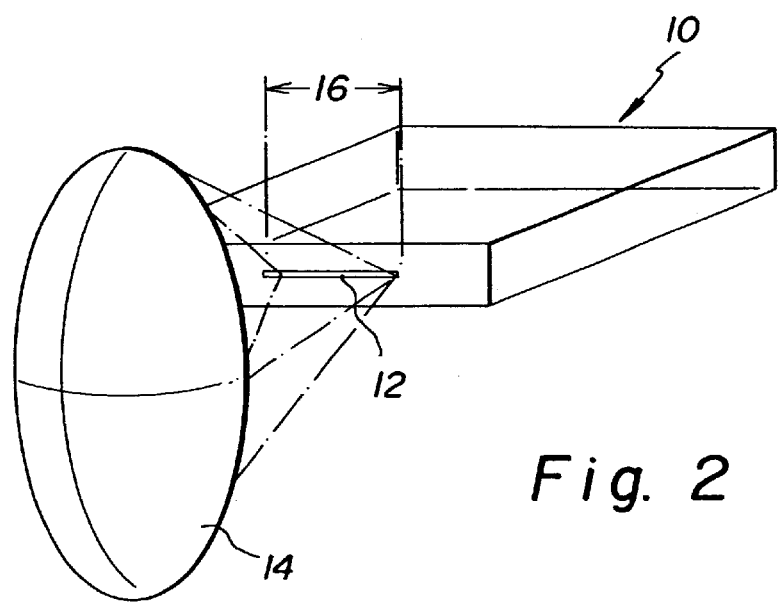
FIG. 2 is a schematic view of the emitting aperture and the emitted light of a typical multimode laser.
Figure 3A:
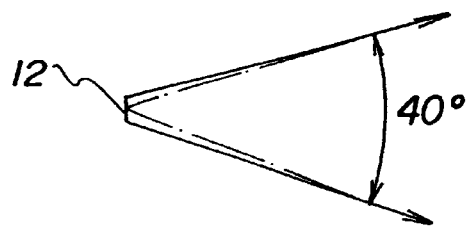
FIGS. 3A and 3B illustrate a laser beam cone emitted from the emitting aperture of a diode laser.
Figure 3B:
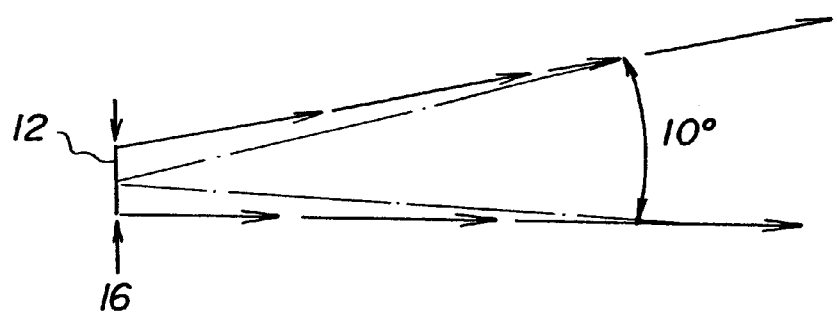
Figure 4:
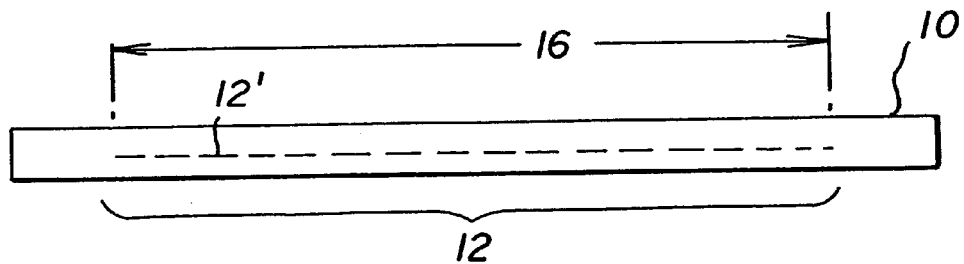
FIG. 4 illustrates schematically a laser with an emitting aperture comprising an array of small apertures.

With reference to FIG. 2, the emitting aperture 12 of a typical multimode 1 Watt edge emitting diode laser 10 is 100 $\mu$ by 1 $\mu$. This narrow emitting aperture is a direct result of the manufacturing process. Higher power lasers have longer emitting apertures. For example, a 2 Watt laser will typically have an emitting aperture with dimensions of 200 $\mu$ by 1 $\mu$. The laser light (from the 1 Watt laser) is emitted from the 100 $\mu$ by 1 $\mu$ emitting aperture into a cone 14 of typically 10° full width half maximum (FWHM) by 40° FWHM. FIGS. 3A and 3B schematically show a greatly enlarged aperture 12 and illustrate that a larger cone angle corresponds to a small aperture dimension and a smaller cone angle corresponds to a large aperture dimension. The long dimension 16 of the emitting aperture 12 can be formed as an array of small apertures 12' (See FIG. 4) within the 100 $\mu$ by 1 $\mu$ or as one contiguous aperture as shown in FIG. 2.

The Lagrange value H of a laser beam is commonly defined as the product of half the beam size and half the divergence angle. The beam size is defined as half the emitting aperture diameter for a multimode laser and as FWHM beam waist radius for a single mode laser.

A typical single (spatial) mode laser has a Lagrange value of H=0.35*$\lambda$/$\pi$, where $\lambda$ is the wavelength of the laser beam. Therefore, for a wavelength of 0.83 $\mu$ the Lagrange value of a single mode laser is given by H=0.35*0.83/$\pi$=0.09 $\mu$. A typical multimode 1 watt laser behaves like, and for practical purposes is, a single mode laser in the direction perpendicular to the long dimension of the emitting aperture. Thus, the Lagrange value of the multimode laser in this direction is about 0.09.

In the long dimension of the emitting aperture (i.e., in the direction perpendicular to the short direction) the Lagrange value of the 1 watt multimode laser (with a 100 $\mu$ long emitting aperture) is given by H=(50 $\mu$)*(0.14)=7 $\mu$. This value is much larger then the Lagrange value for the single mode laser and thus we refer to the emission in this direction as multimode emission. It is well known that the number of resolvable spots of a flying spot laser printer along the scan line is inversely proportional to the Lagrange value of the laser beam. This is why flying spot laser printers, invariably use single mode lasers which have the smaller Lagrange value. However, as mentioned above, high power single mode lasers are expensive.

Figure 5:
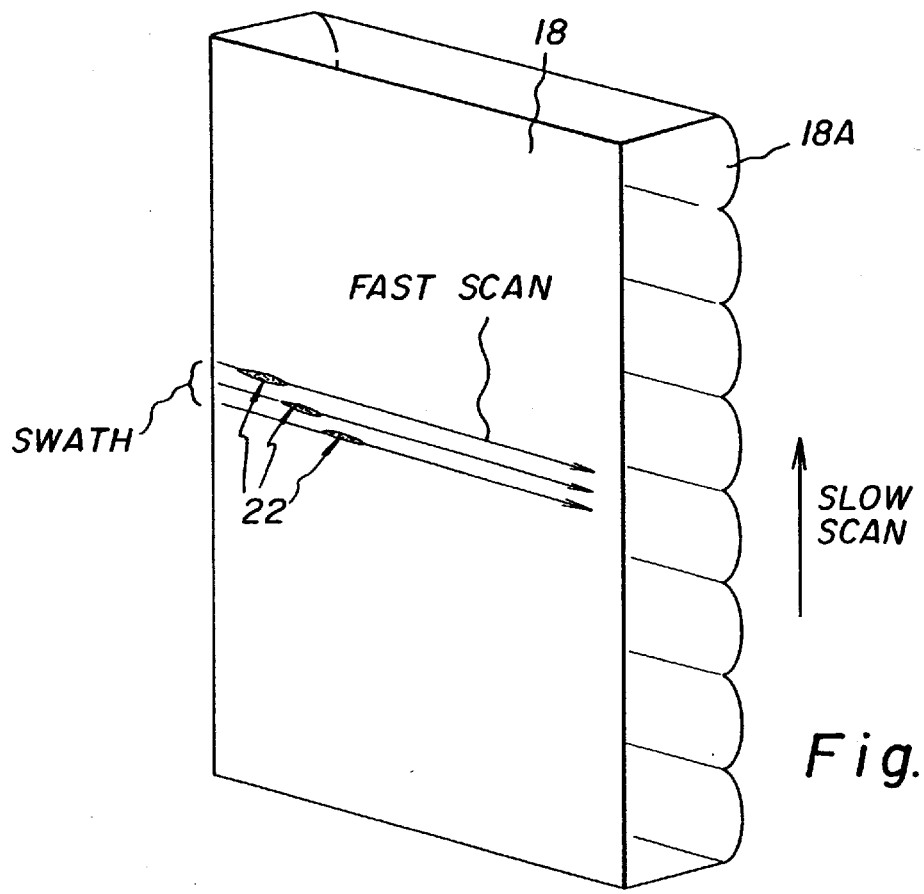
FIG. 5 illustrates schematically the orientation of the scanning spots of the multimode diode lasers during exposure of a lenticular sheet in the fast scan direction.
Figure 6:
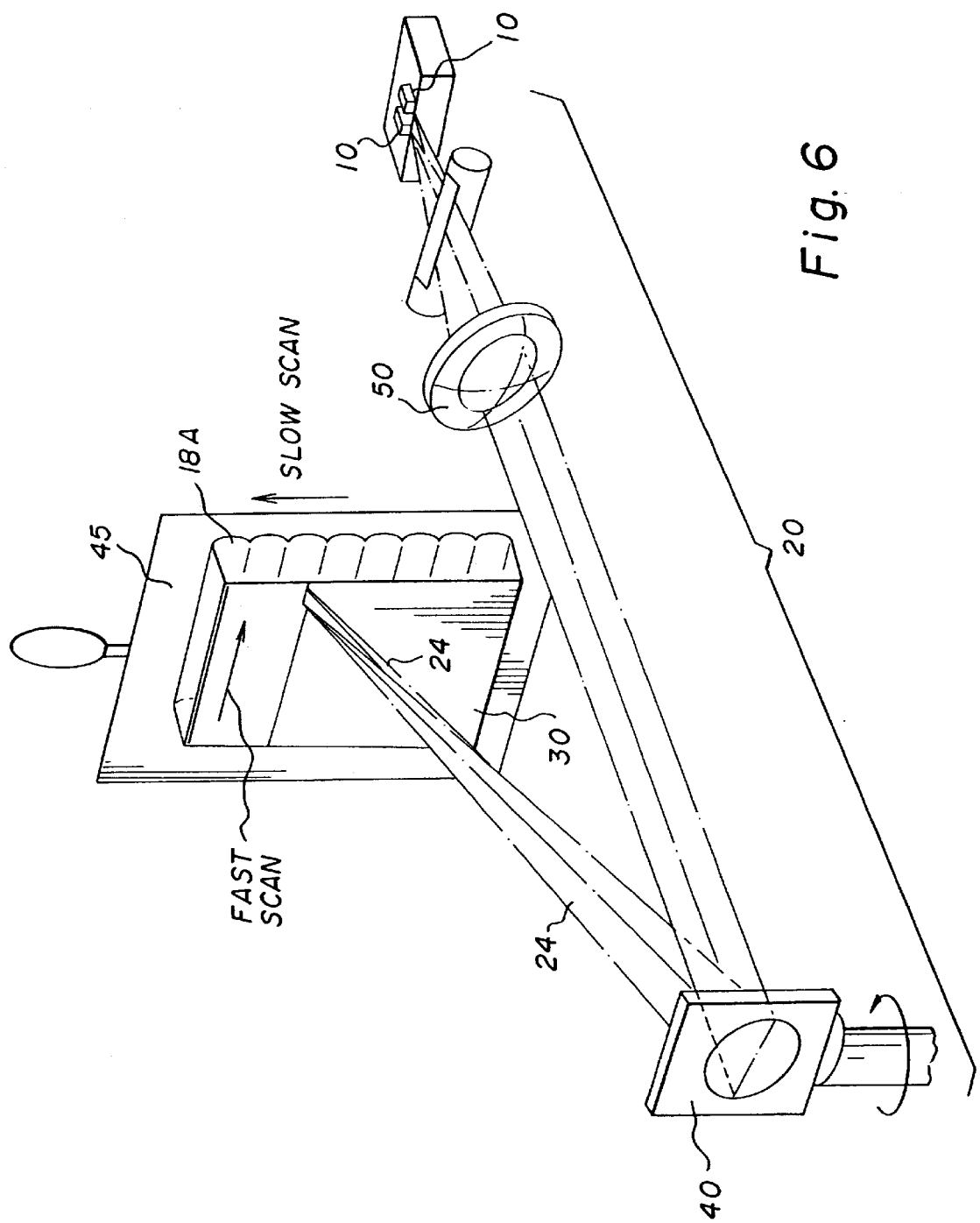
FIG. 6 is a perspective schematic view of a printer showing a stage for translating a lienticular sheet (and a thermal donor if a thermal dye transfer method is used) in a cross-scan direction.
Figure 7:
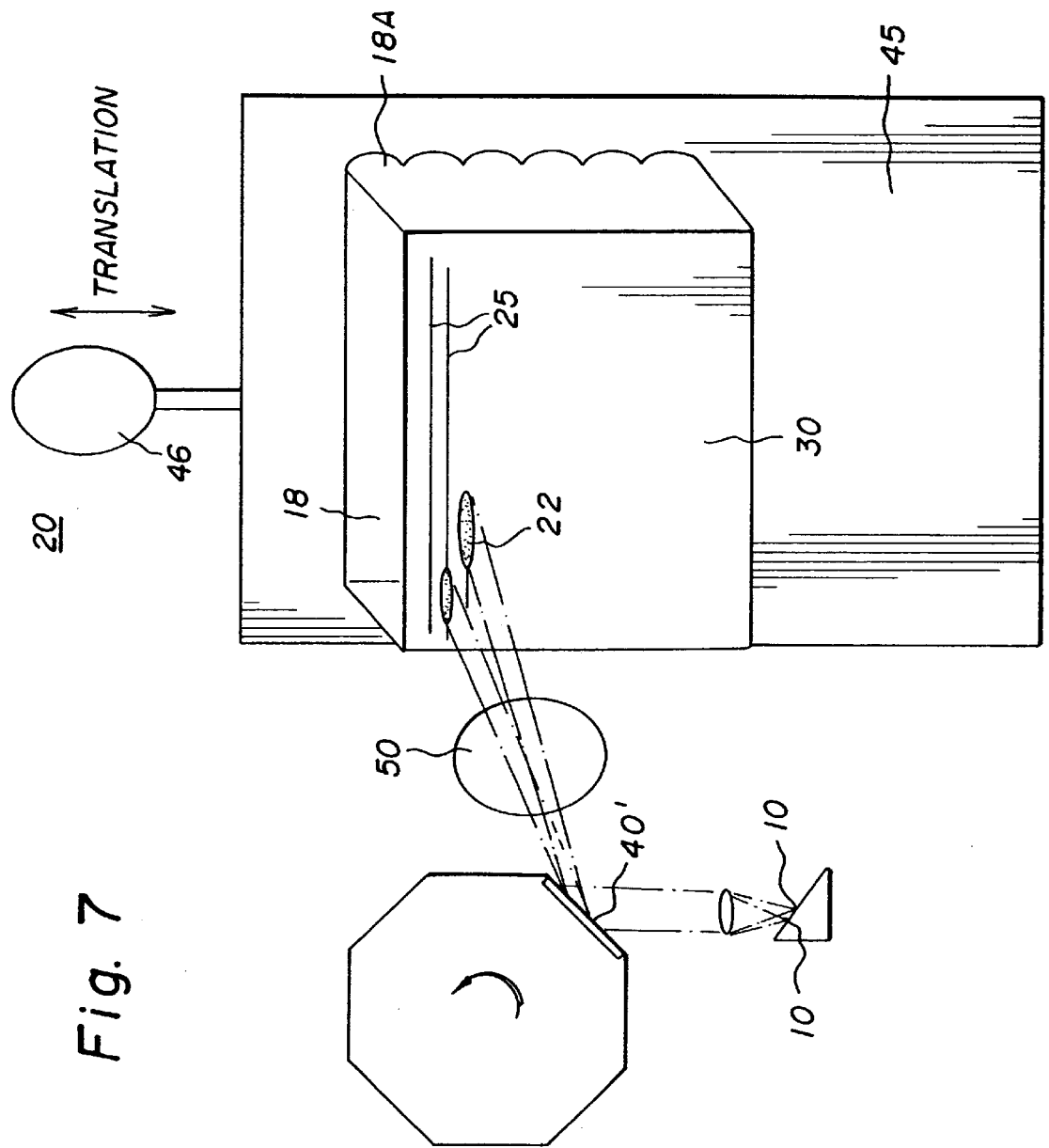
FIG. 7 is a perspective schematic view of a printer utilizing a polygon mirror.

With reference to FIGS. 5–7, the printing of the image lines (forming a lenticular image) on the back surface of a lenticular sheet 18 is done using a flying spot scanner 20 in such manner that the fast scanning direction corresponds to the direction of the long dimension 16 of the emitting apertures 12 of the multimode lasers 10. The printer apparatus uses a plurality of multimode lasers. The multiple laser beams are being used in order to increase the printing speed. The multiple scanning spots 22 formed by the laser beams 24 are longer in the fast scan direction (see FIG. 5). Because of the large Lagrange value of the laser beam 24 in this direction (i.e., the fast-scanning direction) the number of resolvable spots in this direction is considerably smaller than would have been possible with a single mode laser. However, for this application a total number of resolvable spots of about 1000 per (3.5 inch) scan line is acceptable. This is because in the cross-scan direction the resolution is determined by the number of lenticulas per inch, which limits the total number of resolvable spots for each viewed image to a couple of hundreds. As mentioned before, the size of the scanning spot 22 in the cross-scan direction has to be about 10 $\mu$.

Each of the images presented by a lenticular sheet 18 is a relatively low resolution image. However, because of the multiple image lines 25 (one from each image) corresponding to each lenticule 18A, the interlaced image lines 25 have to be very thin and spaced very closely to one another. Thus, the printer recording these image lines 25 must be able to provide high resolution pattern in the cross-scan direction. Therefore, because of the unusual requirements of the lenticular images, namely, the need for a small spot size only in the cross-scan direction, we are able to write with a scanning laser beams 24 which provide spots 22 that are large in the scan direction.

As shown in FIG. 5, the long dimension of the scanning spots 22 provided by the scanning multimode laser beams 24 is along the fast scan (also referred to as a line scan) direction and is preferably perpendicular to the cross-scan direction. The long dimension of the scanning spots corresponds to the long dimensions 16 of the emitting apertures 12 and to beam cross sections with a large Lagrange value. The short dimension of the scanning spots corresponds to the short dimension of the emitting apertures 12 and to beam cross sections with a small Lagrange value. Because of the small size of the scanning spots in the cross-scan direction very narrow lines 25 with width of about 10 $\mu$ are produced by the scanning spots on the recording material 30. The recording material 30 may be, for example, a back surface of a lenticular sheet and a thermally activated donor. Although thermal dye transfer method is preferred, actinically exposed material, such as silver halide, can also be used as a recording material 30 if visible light lasers are utilized. If an actinically exposed material is being used, a thermal donor is not needed.

Figure 8A:
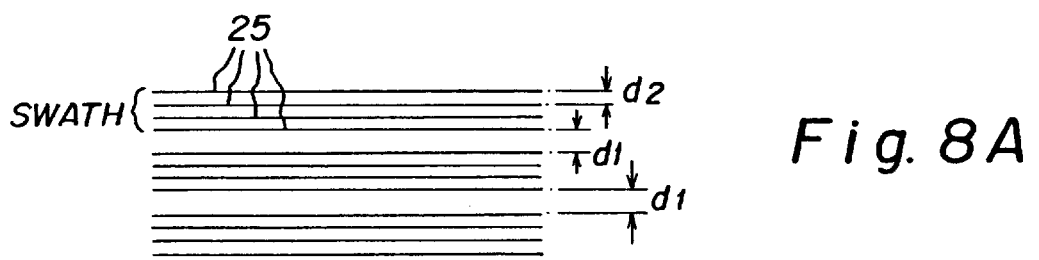
FIGS. 8A and 8B illustrate that swath spacing is different from spacing of image lines within swaths.
Figure 8B:
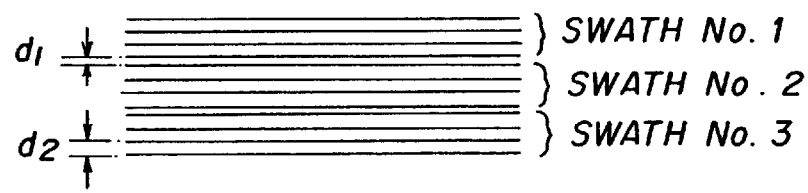

While the laser beams 24 are being scanned, the lasers 10 are being current modulated according to the image data to properly modulate the intensity of the laser beams. To maintain the uniform average spacing between image lines and the proper registration of the image lines with the correct lenticulas, it is preferred that the number of multimode lasers do not exceed 10. It is even more preferred that the number of multimode lasers be 2 to 5. It is most preferable that the number of lasers used be 2. If the number of lasers exceeds 10 the mismatch between the laser spacings accumulates and becomes large enough that the spacing between the image lines produced via a single sweep of the galvanometer mirror becomes noticeable. The "swath" is defined as a collection of scan lines or image lines written with one scan of the galvo-mirror or another scanner. The number of image lines comprising the swath corresponds to the number of laser beams used simultaneously to write these image lines. The speed of the cross-scan transport of the recording media is chosen such that the correct viewing distance will result. Therefore, since the spacing is constant between lasers, the swath spacing $d_1$ differs from the spacing $d_2$ between the image lines 25 in any one swath (i.e., $d_1 \cong d_2$). This is illustrated in FIGS. 8A and 8B.

Figure 9:
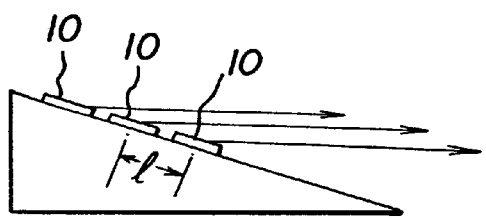
FIG. 9 is a schematic illustration of the laser arrangement on a substrate.
Figure 10:
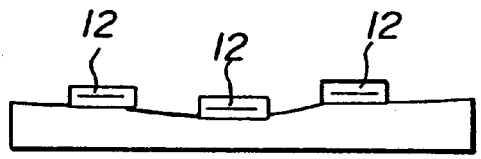
FIG. 10 is a schematic illustration of a sagging substrate.
Figure 11:
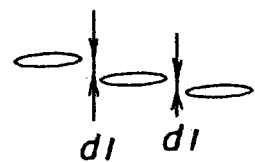
FIG. 11 illustrates an uneven distribution of scanning spots.
Figure 12:
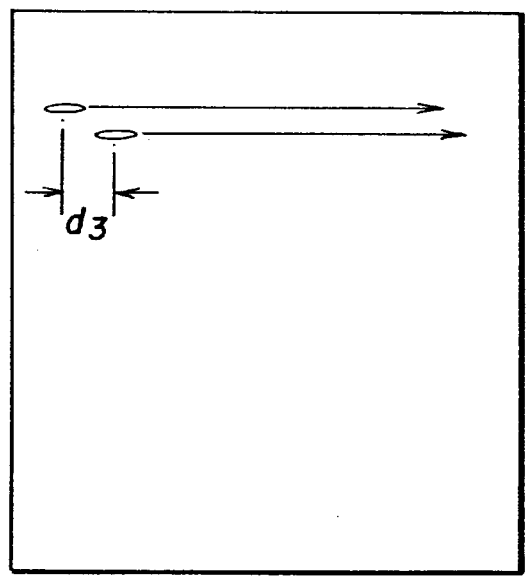
FIG. 12 illustrates that the scanning spots are offset horizontally from one another.

To achieve the multiple scanning spots 22, the multimode lasers 10 are placed on a flat surface in a line with the line parallel to the long axis of the emitting apertures of the multimode lasers. The lasers 10 are then offset or more preferably tilted (FIG. 9) such that the spacing $d_1$ between the scanning spots matches the resolution of the spot generated on the recording material so as to yield no gap, nor a significant overlap. Preferably the beams from the plurality of lasers coincide at the deflector so as to reduce its size. When two multimode lasers are used, the multimode lasers are automatically in line. When more than two multimode lasers are used, warping or curvature of the substrate or in the structure of the lasers 10 themselves may occur (FIG. 10). When there is such a curvature or warping, it is not possible to have a uniform spacing between each of the laser spots (FIG. 11), so that $d_1 \cong d_1'$. Therefore, the curvature or the warping must be compensated for. This leads to significantly more complex mounting of the lasers (when more than 2 lasers are being used). Because of this, the use of only two multimode lasers is preferred. The scanning spots will be horizontally offset (FIG. 12) by a distance $d_3$ (because the lasers themselves have a significant size package requiring them to be offset or tilted with respect to one another and may be for thermal management. This requires the data to each laser to have an offset in the timing between the written pixels. With a laser package having a width of 1 cm, the spacing d between the adjacent emitting apertures is also 1 cm. If the optics train of the printer has a demagnification of 5, then the spacing $d_3$ between the spots at the media in a horizontal (fast scan) direction is 2 mm. This would require an overscan of 2 mm on each side of the scan line (when 2 lasers are being used).

The scanning function is preferably accomplished by a non-resonant galvo-mirror 40 (See FIG. 6) because such a mirror is light weight, offers a large aperture capable of receiving multiple multimode light beams, and is relatively inexpensive.

The recording material 30 is advanced, as shown by a vertical arrow on FIG. 5, in the slow scan (cross-scan) direction so that when the swath is started, one narrow line spacing has been made between the two swaths. As stated before, this spacing can be adjusted to compensate for various environmental changes so that image lines are in registration with the proper lenticulas. The correct viewing distance is obtained and image "scrambling" is minimized or eliminated. The laser beam 24 is focused on the recording material 30 with an optical system 50, for example, an f-θ lens shown in FIG. 6. Such an optical system may be made of refractive and/or reflective component(s).

In order to use a scanning multimode laser beams in conjunction with a thermal dye transfer method, the laser beams are scanned across a thermal donor adhered to the back surface of a lenticular sheet and the scan is conducted in registration with the lenticulas. The stage 45 supporting the recording material is translated by a driver 46 relative to the scanning laser beams 24. If the recording material 30 includes a thermal donor 52A, 52B, 52C, the first thermal donor 52A is removed and the process repeated with two new thermal donors 52B and 52C (of different colors) to achieve a full color image. This is shown in FIG. 13.

The invention has been described in detail with particular reference to certain preferred embodiments thereof, but it will be understood that variations and modifications can be effected within the spirit and scope of the invention.

| PARTS LIST | |
| --- | --- |
| 10 | Diode laser |
| 12 | Aperture |
| 14 | Cone |
| 16 | Long dimension |
| 20 | Flying spot laser scanner |
| 25 | Line |
| 30 | Recording material |
| 40 | Galvo-mirror |
| 45 | Stage |
| 46 | Stage driver |
| 50 | Optical system |
| 52 A, B, C | Dye donors |

What is claimed is:

1. A method for printing multiple images on a recording material by way of at least two multimode laser beams created by emitting apertures of at least two multimode lasers; said method comprising the steps of:

forming with each of said multimode laser beams a spot having a long dimension and a short dimension, such that the long dimension of each of said spots corresponds to a long dimension of a respective emitting aperture of one of said multimode lasers; and deflecting said multimode laser beams across the recording material such that (i) the long dimension of each of said spots is parallel to a scan direction, and (ii) so as to create a series of spaced apart swaths, each of which has a plurality of spaced apart image lines, the spacing between the image lines of one swath being different from the spacing between two adjacent swaths.

2. A method for printing multiple lenticular images on a lenticular sheet having a plurality of lenticulas of a predetermined length and shape on its front side, said method comprising the steps of:

providing at least two laser beams with at least one multimode laser;

orienting the lenticular sheet so that said laser beams, when deflected, scan parallel to the length of the lenticulas; and forming spots having a long and a short dimension with each of said laser beams such that the long dimension of said spots is parallel to the length of the lenticulas;

translating said lenticular sheet so as to create a series of spaced apart swaths, each of which has a plurality of spaced apart image lines, such that spacing between the image lines of a swath is different from spacing between two adjacent swaths.

3. A method according to claim 2 wherein said lenticular sheet is translated in a direction perpendicular to image lines.

4. A method according to claim 2 in which said laser beams thermally transfer dye from a dye donor to said lenticular sheet.

5. A method according to claim 2 wherein said laser beams are deflected by a galvo-mirror.

6. A method as in claim 2 wherein said multimode laser is a diode laser.

7. A method as in claim 2 wherein said multimode laser is a edge emitting diode laser.

8. An apparatus for generating multiple lenticular images on a lenticular sheet having a plurality of lenticulas, said apparatus comprising:

a plurality of lasers each having an emitting aperture, wherein said lasers are multimode in a first direction and single mode in a second direction perpendicular to said first direction;

a scanner oriented to deflect laser beams from said lasers along spaced apart scan lines in a plurality of swaths such that a long dimension of said emitting apertures corresponds to a fast scanning direction of said scanner; and a driver for moving the lenticular sheet relative to said scan lines, said driver capable of moving the lenticular sheet such that the spacing between the scan lines in one swath is different from spacing between two adjacent swaths.

9. An apparatus according to claim 8 wherein said scanner is a galvo-mirror.

10. An apparatus according to claim 9 wherein the lenticular sheet contains silver halide recording material and said lasers are visible light lasers.

11. An apparatus according to claim 9 wherein said lasers are diode lasers.

12. An apparatus according to claim 9 wherein said laser are edge emitting diode lasers.

13. An apparatus according to claim 8 wherein said plurality of lasers include less than 11 lasers.

14. An apparatus according to claim 8 wherein said plurality of lasers consist of two to five lasers.

15. An apparatus according to claim 8 wherein said plurality of lasers consist of two lasers.

16. An apparatus for generating multiple image lines on a recording material, said apparatus comprising:

a plurality of lasers each having an emitting aperture, wherein said lasers are multimode in a first direction and single mode in a second direction perpendicular to said first direction;

a scanner oriented to deflect laser beams from said lasers along spaced apart scan lines in a plurality of swaths such that a long dimension of said emitting apertures corresponds to a fast scanning direction of said scanner; and a driver for moving the recording material relative to said scan lines, said driver capable of moving the recording material such that the spacing between the scan lines of a swath is different from spacing between two adjacent swaths.

17. An apparatus according to claim 16 wherein said scanner is a galvo-mirror.

18. An apparatus according to claim 16 wherein the recording material contains silver halide recording material and said lasers are visible light lasers.

19. An apparatus according to claim 16 wherein said lasers are diode lasers.

20. An apparatus according to claim 16 wherein said plurality of lasers consist of two to five lasers.

21. An apparatus for generating multiple image lines on a recording material, said apparatus comprising:

a plurality of lasers each having an emitting aperture, wherein said lasers are multimode in a first direction and single mode in a second direction perpendicular to said first direction;

a galvo-mirror operable to deflect laser beams from said lasers along spaced apart scan lines in a plurality of swaths such that a long dimension of said emitting apertures corresponds to a fast scanning direction of said galvo-mirror; and a driver operable to move the recording material relative to said scan lines such that spacing between scan lines in one swath is different from spacing between two adjacent swaths.

22. An apparatus according to claim 21, wherein the recording material contains silver halide recording material and said lasers are visible light lasers.

23. An apparatus according to claim 21, wherein said lasers are diode lasers.

24. An apparatus according to claim 21, wherein said plurality of lasers is two, three, four or five lasers.

* * * * *